US010454684B2

United States Patent
Hindocha et al.

(10) Patent No.: US 10,454,684 B2
(45) Date of Patent: Oct. 22, 2019

(54) METHOD FOR AUTHENTICATION USING AN ELECTRONIC DEVICE

(71) Applicant: Tokon Security AB, Solna (SE)

(72) Inventors: Neal Hindocha, Copenhagen (DK); Christopher Lindfeldt, Solna (SE)

(73) Assignee: TOKON SECURITY AB, Solna (SE)

( * ) Notice: Subject to any disclaimer, the term of this patent is extended or adjusted under 35 U.S.C. 154(b) by 198 days.

(21) Appl. No.: 15/515,932

(22) PCT Filed: Sep. 29, 2015

(86) PCT No.: PCT/SE2015/051033
§ 371 (c)(1),
(2) Date: Mar. 30, 2017

(87) PCT Pub. No.: WO2016/053175
PCT Pub. Date: Apr. 7, 2016

(65) Prior Publication Data
US 2018/0234242 A1    Aug. 16, 2018

(30) Foreign Application Priority Data
Sep. 30, 2014  (SE) .................................... 1451162

(51) Int. Cl.
*G06F 21/30* (2013.01)
*H04L 9/32* (2006.01)
(Continued)

(52) U.S. Cl.
CPC ............ *H04L 9/3226* (2013.01); *G06F 21/36* (2013.01); *H04L 9/3236* (2013.01); *H04L 63/083* (2013.01); *H04L 2463/082* (2013.01)

(58) Field of Classification Search
CPC ..................... G06F 21/30–31; H04L 9/3226
See application file for complete search history.

(56) References Cited

U.S. PATENT DOCUMENTS 6,134,661 A * 10/2000 Topp .................. G06F 21/31
345/168
6,161,185 A * 12/2000 Guthrie ............... G06F 21/31
707/999.002
(Continued)

OTHER PUBLICATIONS

International Search Report and Written Opinion from corresponding International Application No. PCT/SE2015/051033, dated Dec. 10, 2015.

*Primary Examiner* — Ponnoreay Pich
(74) *Attorney, Agent, or Firm* — Tucker Ellis LLP; Evan Perrry

(57) ABSTRACT

Method for authenticating a user to a central server (130) and using an electronic device (120,122) with a screen display (121,123). The method comprises the following steps: a) associating each of the devices or users, with a unique set of codes (132), and each code with a piece of information; b) providing a software function, accessible from the selected electronic device; c) providing, on the screen display, a user interface activatable in several different ways, corresponding to different codes; d) specifying pieces of information and determining the corresponding codes; e) calculating a one-way function; f) communicating the calculated value to the central server; g) calculating a comparison output value; and h) authenticating the user if the values are equal. The invention also relates to a system (100) and a computer software product arranged to cooperate with such a system.

17 Claims, 6 Drawing Sheets

(51) Int. Cl.
*G06F 21/36* (2013.01)
*H04L 29/06* (2006.01)

(56) References Cited

U.S. PATENT DOCUMENTS

| | | | | |
|---|---|---|---|---|
| 6,272,545 | B1 * | 8/2001 | Flanagin | G06F 8/61 709/201 |
| 6,668,322 | B1 * | 12/2003 | Wood | G06F 21/41 713/182 |
| 6,934,860 | B1 * | 8/2005 | Goldstein | G06F 21/36 713/183 |
| 8,756,672 | B1 * | 6/2014 | Allen | G06F 21/36 345/173 |
| 8,769,637 | B2 * | 7/2014 | Janzen | G06F 21/31 380/255 |
| 8,949,974 | B2 * | 2/2015 | Narendra | H04M 1/673 380/241 |
| 9,357,388 | B2 * | 5/2016 | Grimme | G06F 21/36 |
| 2002/0029341 | A1 | 3/2002 | Juels | |
| 2005/0005174 | A1 * | 1/2005 | Connors | G06F 21/31 726/19 |
| 2008/0092216 | A1 | 4/2008 | Kawano | |
| 2008/0181403 | A1 * | 7/2008 | Sakamoto | H04L 9/3236 380/258 |
| 2009/0187986 | A1 * | 7/2009 | Ozeki | G06F 21/36 726/21 |
| 2009/0293119 | A1 * | 11/2009 | Jonsson | G06F 21/36 726/19 |
| 2010/0117792 | A1 * | 5/2010 | Faith | G06F 21/36 340/5.81 |
| 2010/0229224 | A1 * | 9/2010 | Etchegoyen | G06F 21/31 726/5 |
| 2010/0242104 | A1 * | 9/2010 | Wankmueller | G06F 21/36 726/9 |
| 2010/0322485 | A1 * | 12/2010 | Riddiford | G06F 21/36 382/115 |
| 2011/0004943 | A1 * | 1/2011 | Chaganti | H04L 29/06 726/30 |
| 2011/0154452 | A1 * | 6/2011 | Novack | H04L 63/08 726/5 |
| 2011/0314529 | A1 | 12/2011 | Bailey | |
| 2012/0159609 | A1 * | 6/2012 | Griffin | G06F 21/36 726/17 |
| 2012/0198535 | A1 * | 8/2012 | Oberheide | H04L 63/0272 726/9 |
| 2013/0003976 | A1 * | 1/2013 | An | H04L 9/0825 380/277 |
| 2013/0047236 | A1 * | 2/2013 | Singh | G06F 21/36 726/7 |
| 2014/0020058 | A1 * | 1/2014 | White | G06F 21/36 726/2 |
| 2014/0289833 | A1 * | 9/2014 | Briceno | H04L 63/08 726/7 |

* cited by examiner

METHOD FOR AUTHENTICATION USING AN ELECTRONIC DEVICE

RELATED APPLICATION DATA

This application is a national phase application of International Application No. PCT/SE2015/051033 filed Sep. 29, 2015 and published in the English language, which claims priority to SE 1451162-0 filed Sep. 30, 2014, which are hereby incorporated herein by reference.

The present invention relates to a method and a system for authentication a user to a central server, using an electronic device having a screen display. In particular, the invention relates to such a method and system for entering and transferring a shared secret, such as an alphanumerical string, from such an electronic device to a central server.

In many situations it is desirable to use an electronic device, such as a personal computing device, a handheld communications unit such as a smartphone, or the like, for authenticating a user to a central server, many times over the internet. For instance, when logging into various services, it is often necessary to provide login credentials such as user names, passwords, etc., via an electronic device used to access said service. In other cases, a PIN code is provided to a user via a secondary channel, such as via an SMS (Short Message Service) message, and the user needs to provide the PIN code to a central server for authentication. There are many more, similar examples of when information representing a shared secret is requested, for authentication purposes, by a central server and from a user operating an electronic device which is in communication with the central server.

There are typically security problems relating to such information provision. For instance, a malware, such as a so called Trojan Horse, can be planted on the electronic device and used to scan for user input via an input control such as a software-implemented on-screen keyboard on a touchscreen smartphone, in particular if such keyboard is provided by the operating system of the smartphone, or a physical keyboard on a PC computer. Another threat is a man-in-the-middle attack in which a third person intercepts a data stream between the electronic device and the central server. Brute force attacks are also common, where a great number of possible PIN codes, or the like, are tested using automated scripts. In these and other cases, the shared secret runs the risk of being captured and interpreted by a non-eligible third party, which is not desirable.

In order to solve this problem, encryption may be used. However, even an encrypted signal is sensitive to attacks, especially keyboard monitoring-type attacks and software designed to scan the internal memory of a particular electronic device for information similar to PIN codes, passwords and the like. Hence, there is a need for providing a secure way of communicating a shared secret from an electronic device to a central server.

The present invention solves this problem.

Hence, the invention relates to a method for authenticating a user to a central server and using a selected one of several electronic devices, which electronic devices each comprises a screen display and are arranged to communicate with the central server, characterised in that the method comprises the steps a) associating, in the central server, each of the electronic devices and/or each of a set of registered users, with a respective unique set of different digitally stored codes, known to both the electronic device in question and to the central server, and associating each individual code with a certain piece of information in a predetermined set of information pieces; b) providing a software function, accessible from the selected electronic device; c) causing the software function to provide, on the said screen display of the selected electronic device, a graphical user interface comprising a user control which can be activated in several different ways, where different ways of activation are associated with different respective codes selected from said unique set of codes for the selected electronic device and/or the user; d) allowing the user to specify at least one piece of information by activating the user control in the corresponding respective way, and determining the corresponding at least one associated code; e) calculating an output value of a predetermined one-way function, to which the said determined at least one code is used as input value; f) communicating the calculated output value from the selected electronic device to the central server; g) causing the central server to calculate a comparison output value of the said one-way function, using as input values the respective codes having been associated, in step a), with a certain expected set of information pieces which the user is expected to have specified in step d); and h) authenticating the user if the calculated comparison output value equals the calculated output value.

Furthermore, the invention relates to a system for authenticating a user, comprising a central server arranged to authenticate the user using a selected one of several electronic devices, which electronic devices each comprises a screen display and are arranged to communicate with the central server, characterised in that the central server is arranged to associate each of the electronic devices and/or each of a set of registered users, with a respective unique set of different digitally stored codes, known to both the electronic device in question and to the central server, and to further associate each individual code with a certain piece of information in a predetermined set of information pieces, in that the system further comprises a software function, accessible from the selected electronic device, which software function is arranged to provide, on the said screen display of the selected electronic device, a graphical user interface comprising a user control which can be activated in several different ways, where different ways of activation are associated with different respective codes selected from said unique set of codes for the selected electronic device and/or the user, to allow the user to specify at least one piece of information by activating the user control in the corresponding respective way, and determining the corresponding at least one associated code to calculate an output value of a predetermined one-way function, to which the said determined at least one code is used as input value, and to communicate the calculated output value from the selected electronic device to the central server, and in that the central server is arranged to calculate a comparison output value of the said one-way function, using as input values respective codes having been associated with a certain expected set of information pieces which the user is expected to have specified and to authenticate the user if the calculated comparison output value equals the calculated output value.

Also, the present invention relates to a computer software product arranged to be accessible from an electronic device comprising a screen display and being arranged to communicate with a central server in turn being arranged to authenticate a user of the electronic device, characterised in that the computer software product is arranged to store a set of different digitally stored codes, a set of information pieces and a specification of a predetermined one-way function, and to associate each individual code with a certain piece of information in the said set of information pieces, in that the computer software product is further arranged to provide, on the said screen display of the electronic device, a graphical user interface comprising a user control which can be activated in several different ways, where different ways of activation are associated with different respective codes selected from said set of codes, to allow the user to specify at least one piece of information by activating the user control in the corresponding respective way, and to determine the corresponding at least one associated code, and in that the computer software product is further arranged to calculate an output value of the said one-way function, to which the said determined at least one code is used as input value, and to communicate the calculated output value from the selected electronic device to the central server.

In the following, the invention will be described in detail, with reference to exemplifying embodiments of the invention and to the enclosed drawings, in which.

Figure 1:
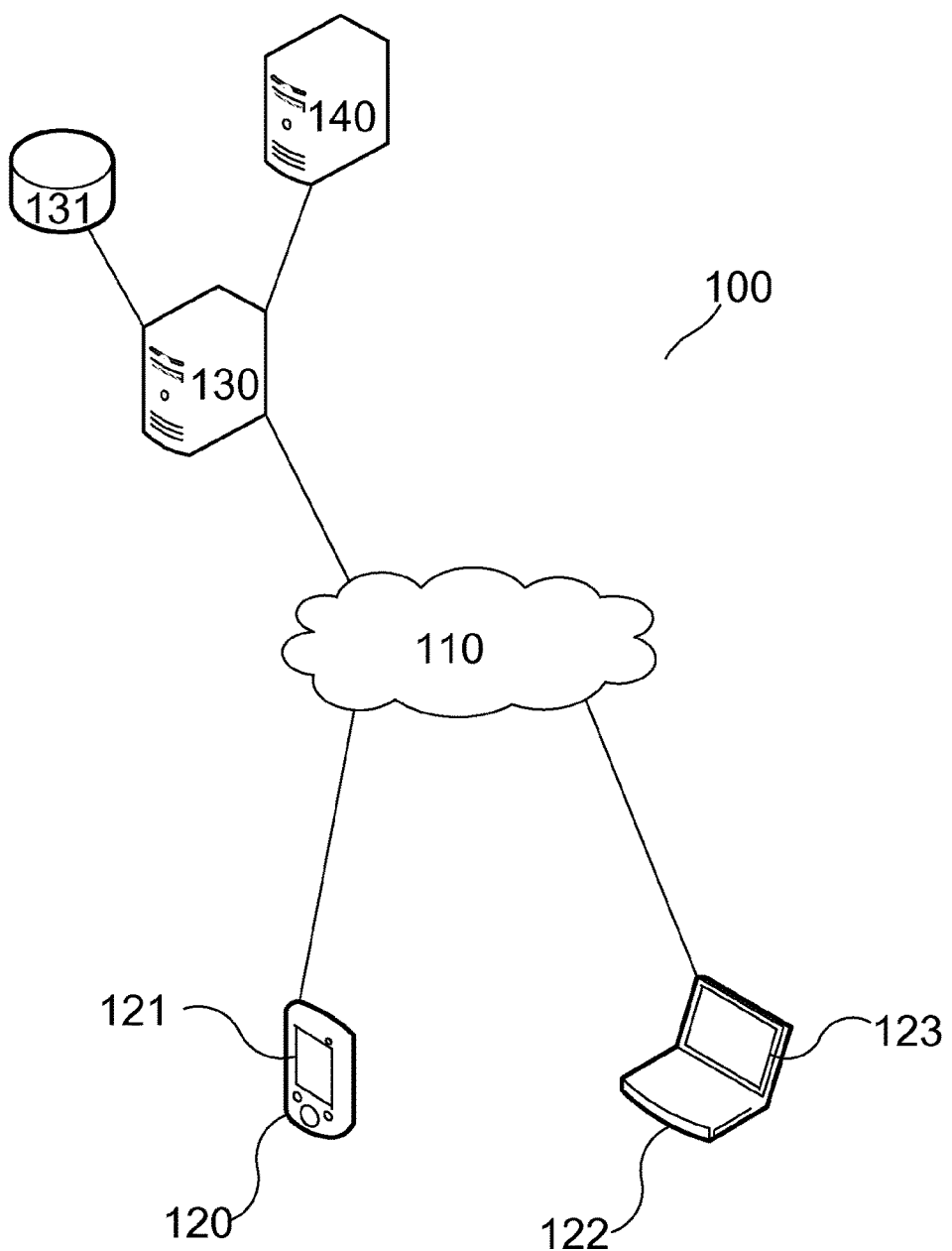
FIG. 1 is an overview diagram of a system arranged to perform a method according to the present invention.

Hence, FIG. 1 illustrates a system 100 for performing a method according to the present invention.

Two different electronic devices 120, 122, preferably mobile electronic devices, are each connected to the internet 110, preferably but not necessarily via a wireless connection such as WiFi, GPRS, LTE or the like. The electronic device 120 is in the form of a handheld, portable device such as a mobile phone, for instance a so-called smartphone. The device 122 is in the form of a personal computer, such as a PC, which is also preferably portable. Both devices 120, 122 feature a respective screen display 121, 123 capable of showing raster images defined by pixel sets of certain color and/or light intensity. It is realized that the electronic devices 120, 122 merely constitute examples of electronic devices suitable for use with the present method. For instance, a stationary computer with a separate screen may also be used, having a wired internet connection.

Furthermore, according to the invention a central server 130 is also connected to the internet 110, and thereby to devices 120, 122. The central server 130 is connected to or comprises a first database 131. When it is said herein that certain information is stored in the server 130, it may equally well be stored in the database 131 and vice versa. All such storing is preferably digital storing.

It is preferred that at least two, however more preferably at least ten, more preferably at least 100, most preferably at least 1000 different electronic devices 120, 122 are used together with the server 130, in the sense that they are each registered with the server 130 and able to communicate with the server 130.

A requesting server 140 is preferably connected to, and arranged to communicate with, the central server 130. Specifically, the server 140 is arranged to request the server 130 to in turn authenticate the user of either device 120, 122, by requesting that the user submits to the server 130 a secret which is shared between the central server 130 and the user. Moreover, the server 140 is preferably also connected to the internet 110. The server 140 needs not be a part of the system 100, but may be an external, standalone server 140. Preferably, the system 100 comprises the server 130, the database 131 and the below described software function accessible via the electronic devices 120, 122, which devices need not be a part of the system 100 as such.

Servers 130, 140 can be standalone or distributed servers, physical or virtual servers, or any other conventional type of serving functionality arranged to provide digital services to clients via some type of digital interface. The corresponding is true regarding the database 131.

Figure 2:
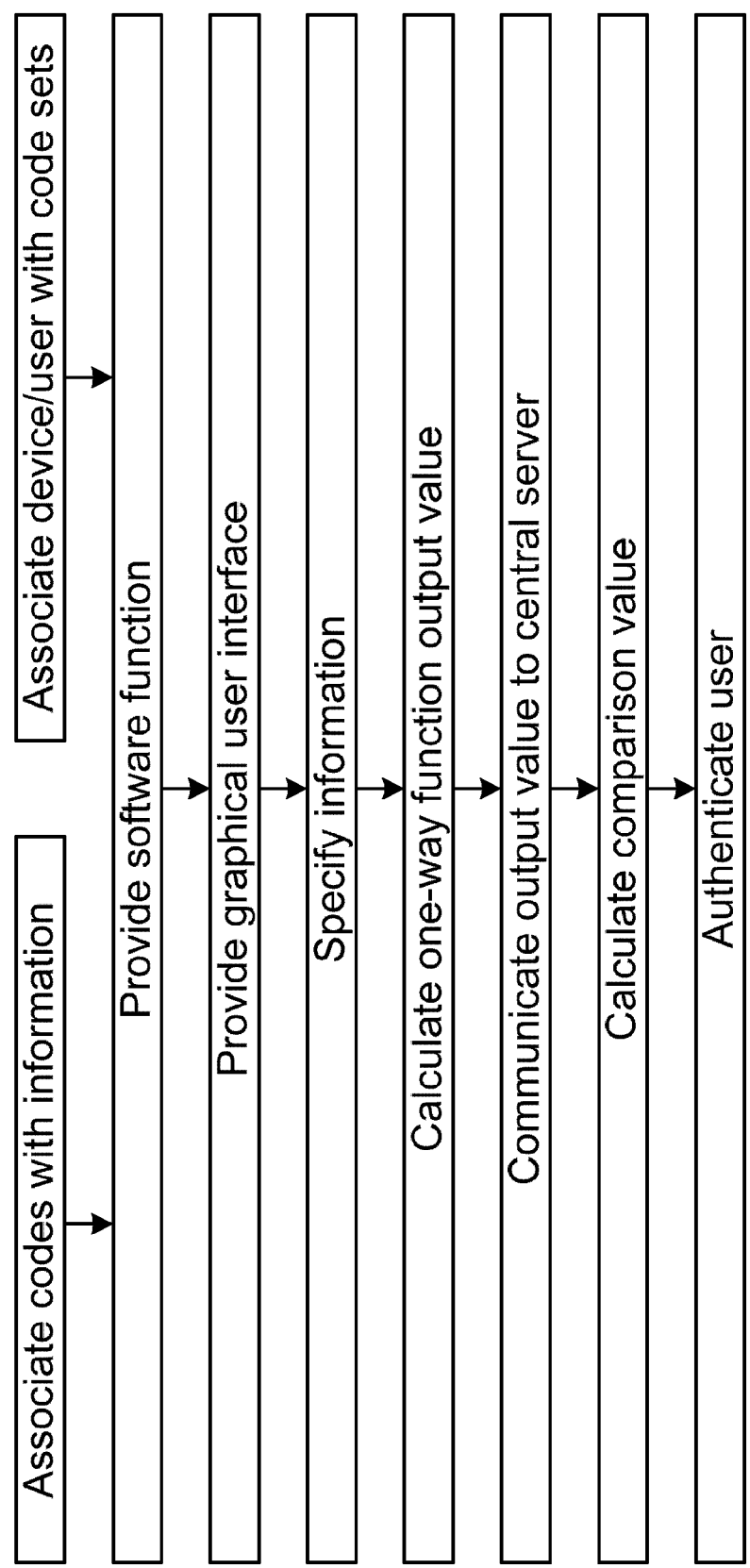
FIG. 2 is a flow chart of an exemplifying embodiment of the method according to the invention.

FIG. 2 illustrates a method according the invention for authenticating a user to the central server 130 and using a selected one of the several electronic devices 120, 122, which electronic devices each comprises a respective screen display 121, 123 and is arranged to communicate with the central server 130.

In one preferred embodiment, the requesting server 140 is in communication with a user to be authenticated, for instance via the device 120, 122, before the method commences. For instance, the server 140 may provide a service to a user of the device 120, 122 such as an online banking service or any other conventional online service which is performed or delivered over the internet 110. During such communication, for instance as a part of a particular service provision, the server 140 wishes to authenticate the user for some reason.

What is said herein applies equally well to the situation in which the server 130 itself provides a particular service to the user in question, as a result of which service provision the server 130 wishes to authenticate the user. Hence, in some embodiments there is only one server 130.

Hence, in a first step, each of the electronic devices 120, 122 and/or each of the users being registered with the system 100, are associated, in the central server 130, with a respective unique set of different digitally stored codes, known to both each electronic device 120,122 in question and to the central server 130. Such codes may be any information which may be stored for reference both in the database 131 and the device 120, 122 in question, with preferred examples comprising alphanumerical strings, preferably numbers. Hence, for each participating electronic device 120, 122, a set of such codes is stored, both in the database 131 (and hence known to the central server) and in a way accessible to the electronic device, such as in a safe and preferably encrypted storage area in the internal memory of the device (such as the "keychain" functionality of the operating system IOS), or alternatively in a local or external (to the electronic device) database, safely accessible from the software function described below. Preferably, the respective software function described below has sole access to one copy of the codes associated with the electronic device in question, and the central server has sole access to another such copy. It is preferred that the copy of said codes which is accessible to the said software function is stored physically in the electronic device in question.

The set of codes for each participating device 120, 122 and/or for each registered user is unique in the sense that no two participating devices 120, 122 and/or no two registered users share the same set of codes. In either case, it is preferred that the codes are stored in a safe way, preferably encrypted and only accessible to the software function, locally in a memory of a respective electronic device 120, 122. In case several electronic devices 120, 122 are used by one and the same user, a respective copy of the codes may be stored in each of these devices. One and the same electronic device 120, 122 may also store codes for several users. In the latter case, it is preferred that a user can select in the name of what user to act as a sub step of the authentication method according to the present invention.

Such selection can be made dependent on a conventional, locally performed username/password login step.

Furthermore, each individual code is associated with a certain piece of information in a predetermined set of information pieces. Such a piece of information may be any well-defined information, such as different logical entities, such as "cat", "red" or "fast"; an alphanumerical character; or any other type of information.

Hence, in this first step both the unique code sets, and preferably also the corresponding pieces of information, are shared between the server 130 and the respective electronic device 120, 122. The pieces of information are preferably also stored in both the database 131 and in a way accessible to the software function, as described above. This sharing may take place in a conventional, safe manner. Preferred examples comprise setting up a secure channel, such as a VPN (Virtual Private Network) tunnel, between the server 130 and the electronic device 120, 122 in question, and communicating the shared information between the parties over this channel. For instance, the telephone 120 may receive an SMS (Short Message Service) with a one-time password, in turn used to set up a VPN tunnel to the server 130. Alternatively, the shared information may be communicated to the software function, which thereafter communicates directly with the respective electronic device 120, 122. This step preferably takes place only once, in connection to installation or registration of the electronic device 120, 122 in question. Hence, this first step is preferably performed for several mobile electronic devices, such as all the above mentioned electronic devices used with the central server 130.

Moreover, it is preferred that each code is created as a randomly selected value upon said installation or registration. Preferably, each code is a randomized alphanumerical sequence which is generated upon initiation of the software function on the electronic device 120, 122 in question, and shared between the software function and the central server 130. The "initiation" of the software function means, for instance, the installation or first access of the software function on or from the electronic device 120, 122 in question.

Then, in a second step, the said software function is provided to the selected one electronic device 120, 122 to be used for authenticating the user, in such a way so that it is accessible from the specific electronic device.

That the software function is "accessible from" the selected electronic device means that a user of the device is provided access to functionality of the software function via the device 120, 122 itself, preferably in the form of the below described interactive graphical user interface to the software function, which is then provided by the software function on a screen display 121, 123 of the device 120, 122 in question. As such, the software function may for instance be a computer program locally installed on the device itself; a remotely accessed software function such as a HTML5 web page accessed from the device itself via a standard web browser; or a combination of a locally installed application and remotely accessed web services.

It is important that the software function in one way or the other is accessible via the electronic device 120, 122 in an individualized way, in the sense that the software function will have access to unambiguous information regarding the identity of the electronic device 120, 122 itself in connection to such access. Such unambiguous information preferably uniquely identifies hardware of the electronic device 120, 122 in question itself, and preferably not only information which is not necessarily unique to the device itself, such as for instance an IMSI (International Mobile Subscriber Identity) or MSISDN of a SIM card installed in the electronic device 120, 122.

Then, in a third step, the said software function is arranged to provide, on the said screen display 121, 123 of the selected electronic device 120, 122 in question, a graphical user interface, which is preferably interactive.

According to the invention, the graphical user interface comprises a user control which can be activated in several different ways, where different ways of activation are associated with different respective codes selected from the above described unique set of codes for the selected electronic device 120, 122 in question. Typically, the user will, by activating the user control in a particular way, such as by pressing a button or marking a field comprised in the user control, specify a particular one of said pieces of information, which is also associated with a particular one of said unique set of codes.

Such a user control can have many different forms, such as by way of example a drop-down list, where the selection of different items results in the user control being activated in different ways; a set of graphical buttons each one representing a different activation way; and the two examples of selectable fields and an input field, respectively, as described in detail below.

In general, it is preferred that the software function is arranged to produce and control the behavior of the user control itself, in a way so that the software function can capture user interaction events with the user control directly and without any other software function gaining access to such interaction events. In particular, it is preferred that services provided by the operating system of the electronic device will not be used in such a way so that the operating system gains access to the informational content of the communication between the user and the device. For instance, the operating system may not be used for any user interactivity functionality on higher programming architecture levels than those being specified in terms of pixels on the screen display. Specifically, an operating system-provided text entering functionality, such as a virtual keyboard, is preferably not used by the software function. However, an operating system-provided graphics processing service can be employed for drawing individual lines and the like on the screen display, for capturing user selection events in terms of selected pixel on-screen locations, and so on.

As an example, in the above-described drop-down list example, the drop-down control itself should be drawn by the software function rather than using a service provided by the operating system or any other piece of software which is not an integrated part of the software function.

What is important in all these cases is that no other software functions, such as the electronic device 120, 122 operating system, gains access to information in a context making it possible for such software function to determine the pieces of information specified by the user, or the codes associated with these pieces of information.

Thereafter, in a fourth step, the user is namely allowed, by the software function, to specify at least one, preferably at least two, most preferably at least four, of the above discussed pieces of information. This specification takes place, according to the invention, by activating the user control in the corresponding respective ways. Namely, the different activation ways of the user control are associated with different pieces of information. Moreover, the corresponding at least one code in said unique set of codes is determined, which code beforehand has been associated with the particular activation way imparted to the user control by the user.

It is realized that the activation ways, the pieces of information and the codes can be associated one with the other in various ways. What is important is that each activation way can be tied unambiguously to one particular piece of information and to one particular code. Moreover, the piece of information may be only implied, in the sense that an activation way may be associated with a particular code without being explicitly associated with the piece of information, while the piece of information is deduced by the user based upon information presented in or in connection to the user control.

It is preferred that the user control provides information to the user regarding what respective piece of information corresponds to what activation way of the user control. In the preferred embodiment in which the actual pieces of information have been shared between the central server 130 and the device 120, 122 in question, the software function may use graphics, such as symbols and/or text and/or patterns, to point out to the user what activation ways result in the specification of which piece of information. In other examples, the central server 130 may provide the electronic device 120, 122 with digital information, such as an image, comprising the pieces of information in a way which is not readily understandable by the software function with respect to its information content.

For instance, the user control may comprise different fields, as described below, and the central server 130 may, in an initial step, have provided the software function with an image intended to be displayed on the screen display 121, 123 in an overlay fashion, said image comprising markings or the like providing information to the user regarding what fields correspond to what piece of information. In yet other embodiments, such an image, or other corresponding information, may be provided by the user him- or herself, which information makes it easy for the user to distinguish between different fields on the screen display 121, 123 in a way not readily understandable by the software function because the software function has no knowledge about how to interpret the said image data contextually.

It is preferred that the order of the user activations of the user control, and hence the order of the specified codes, is noted.

Thereafter, in a fifth step, an output value of a predetermined one-way function is calculated, by the software function and preferably exclusively locally on and by the electronic device 120, 122 using software executing on the electronic device 120, 122 hardware. To the one-way function, the said determined at least one code, associated with a particular way in which the user has activated the user control, is used as input value.

A "one-way function" is a function the input value of which is, in practice, impossible to determine based only upon the corresponding function output value, and which is substantially one-to-one in the sense that in practical applications, two different input values will in practice always result in two different output values. Examples include many hash functions which are conventional as such, such as SHA hash functions, such as SHA-1, SHA-2 and SHA-3, as well as MD5.

Hence, the one or several codes indirectly specified by the user by said activation are used as input parameters to such a one-way function, whereby the said output value is created in a way so that it is, in practice, impossible to derive the output value without knowledge of the values of the specified codes. It is preferred that the above mentioned order of the codes is used in this calculation.

Then, in a sixth step, the calculated output value is communicated from the selected electronic device to the central server. This communication of the calculated output value can take place over a non-encrypted communication channel, since an eavesdropper will not be able to interpret the output value.

In a seventh step, the central server 130 is then arranged to calculate a comparison output value of the same one-way function. In this calculation, the pieces of information indirectly specified by the user by his or her activation in different ways of said user control are compared to an expected set of information pieces, selected from the same general set of information pieces as described above in connection to the device 120, 122, with the aim of checking for correspondence between the two. Hence, in the corresponding way as in the above described calculation of the output value by the electronic device 120, 122, the respective codes having been previously associated, in the central server 130, with the certain expected set of information pieces are used as input values to the one-way function, here also preferably using the expected order of the codes. Thus, the expected pieces of information are those that the user is expected to have specified using the user control as described above, preferably in a particular order.

Then, in an eight step, the user is authenticated if the calculated comparison output value, as calculated by the central server 130, equals the calculated output value, as calculated by the electronic device 120, 122 and communicated to the central server 130. This authentication is preferably determined by the central server 130 after the calculation of the said comparison value.

Then, the central server 130 may communicate the result of the authentication (such as "yes" or "no") to a requesting server such as the server 140, possibly also comprising personal information regarding the user.

Preferably, the expected set of (possibly ordered) information pieces constitutes a secret which has beforehand been shared between the central server 130 and the software function. Hence, if the two calculated output values are equal, the central server 130 can deduce that the user specified the same pieces of information as was expected, thereby verifying the contents of the shared secret to the central server 130. Then, the user can be authenticated with high security.

Using such a method and such a system 100, an authentication can be achieved with the highest security standards, and with a built-in two-factor authentication level. Namely, since the set of codes is unique to every electronic device 120, 122, and/or to every registered user, the data provided from the electronic device 120, 122 to the central server 130 will depend on the identity of the actual device 120, 122 used for authentication. Hence, the user needs to know the shared secret, in terms of a sequence of information pieces as represented by the activation ways of the user control, and also needs to actually have physical access to the electronic device 120, 122. In a preferred embodiment, the database 131 comprises an association between each user and a specific electronic device 120, 122 as identified in the way described above, and requires each particular user to authenticate using a particular electronic device. The central server 130 will know that the authentication was performed using the particular device, since another device would in this case produce another one-way function output value since it uses a different unique set of codes than the particular device in question.

In the case in which the set of codes is unique to each registered user, it is preferred that a separate authentication step, in which the user is authenticated by the software function, is used before the user is allowed to specify the information pieces. Examples comprise cases where several users share one and the same electronic device 120, 122. Then, a user to be authenticated first logs in to the software function, using the electronic device in question, and then starts the authentication procedure illustrated in FIG. 1, using the graphical user interface provided by the software function.

However, it is preferred that each set of codes is tied to and unique for each electronic device 120, 122, and that each registered user is also tied to a particular electronic device 120, 122, all by associations in the database 131.

Moreover, using such a method and system 100, intrusive attacks directed to one or several electronic devices 120, 122, such as installation of malicious code on the device, will not be successful, since there is no simple way for a piece of code which is not an integrated part of the above described software function to gain access to the set of unique codes for the electronic device 120, 122 in question, even if allowed to execute thereon and granted full access rights.

Still, the user experience can be identical or similar to that of entering a PIN code, a password, a swiping pattern, or similar conventional methods of authentication, wherein the possession of the actual device is not conventionally used as a separate, independent authentication factor as such. This will be detailed in a number of exemplifying embodiments that are described in the following.

It is preferred that the central server 131 is arranged to identify each individual electronic device 120, 122 based on a detected respective individualized local presence of the said software function on the electronic device 120, 122 in question. For instance, the software function can be installed locally on the device 120, 122 and therefore be able to digitally verify to the central server directly that it has a local presence on the device. As an alternative or supplement, the central server 131 is arranged to, preferably via the software function, identify each individual electronic device 120, 122 using a unique hardware property itself, such as a serial number of the electronic device 120, 122, as opposed to information which is not pertinent to the device 120, 122 itself but rather to a SIM (Subscriber Identity Module) card comprised in the electronic device 120, 122. This way, the second authentication factor (something you have) will be tied to the very hardware of the electronic device 120, 122. The identifying information can be read by the software function when executing on the electronic device 120, 122 hardware.

As described above, the said one-way function used must be the same when calculating the output value and the comparison output value. According to one preferred embodiment, the one-way function comprises a hash function, preferred such hash functions comprising PBKDF2 and SCRYPT. According to one embodiment, the one-way function comprises a series of looped one-way functions, so that the output value of a first one-way function is fed as an input value to another one-way function. It is preferred that the series of one-way functions comprises a series of one and the same one-way function used repeatedly in this manner, comprising at least 10, preferably at least 1000, preferably at least 100000 loops, particularly preferably in the case in which the one-way function is or comprises a hash function. This will make brute force attacks on the system 100 difficult to succeed. Preferably, the number of loops is a random variable, the value of which determined during an initial step, such as user registration, in dependence on the hardware performance of the mobile device 120, 122, such that it will take at least 0.1 seconds for the device 120, 122 to calculate the one-way function output value, loops included.

According to a particularly preferred embodiment, in the first step described above, a respective one-way function is identified, or selected among a set of possible one-way functions, and individually associated with each electronic device 120, 122. The associate is stored both in the database 131 and by the software function. This may be a part of a registration or installation step performed ahead of time. Hence, different electronic devices 120, 122 and/or different users may be associated with different ones of the possible one-way functions. Different one-way functions may, for instance, be different hash functions. According to a preferred embodiment, different one-way functions involve different number of loops as described above. In other words, one particular device 120 may be associated with 146322 loops, while another one is associated with 36701 loops. This will further increase protection against brute force attacks.

Figure 3:
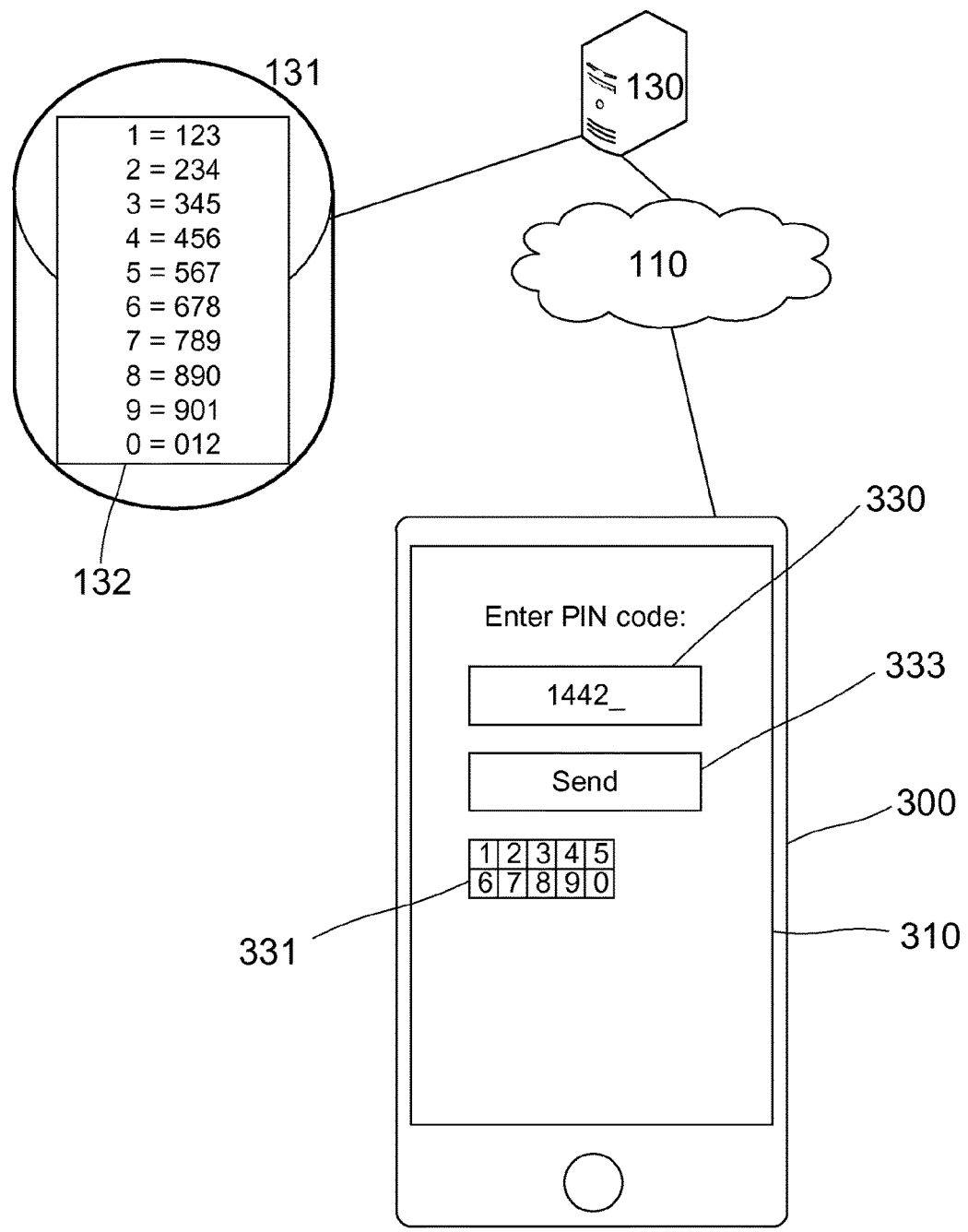
FIGS. 3-6 are respective views of four exemplifying embodiments component parts of a system according to the present invention, in which an exemplifying respective electronic device, in the form of a telephone comprising a screen display, is shown.

FIG. 3 illustrates a first exemplifying embodiment of the present invention. The central server 130, the internet 110 and the database 131 are the same as in FIG. 1, and the device 300 corresponds to devices 120, 122. The database 131 comprises a unique set of codes 132 associated with the particular electronic device 300, using which a particular user is to be authenticated to the server 130. The device 300 comprises a screen display 310, on which a software function, such as a locally installed software application executing on the device 300 and arranged to communicate with the central server 130 via wireless internet 110, is arranged to provide an interactive graphical interface, as shown in FIG. 3. The graphical interface comprises a text box 330, in which the user may enter a PIN code used for authentication. The text box and its informational content is not produced by the operating system of the device 300, but rather by the software application directly. The input is made via a set of graphical buttons 331, presented on the screen 310 by the software function, that may be selected for instance using touchscreen technology. The software handles selection events, redrawing of the user interface, etc., itself. Hence, the operating system will not be notified or informed about events, such as the user entering characters in the text box 330, as such.

In this case, the text box 330 in combination with the set of buttons 331 is the user control, and the above described different activation ways corresponds to entering different characters, one after the other, in the text box 330.

The software function executing on the device 300 also comprises or has access to the information 132, both the values of the unique set of codes "123", "234", etc., and the association to the respective pieces of information "1", "2,", etc. The information 132 has been communicated to the software function during an installation procedure of the software function. The graphical user interface further comprises a send button 333, which when pressed is arranged to take each character in the text box 330, determining a corresponding code, concatenating the codes to a character string, hashing the resulting string 100000 times and sending the resulting hash value to the central server 130. In the example shown in FIG. 3, the code entered is 1442, corresponding to codes (see reference numeral 132) "123", "456", "456" and "234". The concatenated string is therefore "123456456234". This string is hashed 100000 times, using a predetermined looped hash function, and the final result, in other words the output value of the one-way function, is sent to the central server 130.

Hence, in this case, the "information pieces" are the individual digits entered in the text box 330. The unique set of codes is the set of codes "123", "234", etc., shown in 132.

The central server 130, in turn, expects the user to enter the PIN code "1442", since this PIN code constitutes the shared secret which has been shared between the software function and the central server 130 in an initial step, such as during registering of the user in question. Therefore, the server 130 produces the concatenated string "123456456234", in a way similar to the one described above, using the information 132 stored in the database 131, and hashes this string 100000 times, using the same, previously agreed, looped hash function as the software function, to produce a final result which is then compared to the said output value of the one-way function. In this case, the two compared values will be the same, and the user will be authenticated by the central server 130.

It is realized that concatenation is one of many possible examples of how to feed several input values to a one-way function. Even if concatenation into one single character string is a particularly simple method, it would also be possible to, for instance, provide a one-way function with four distinct, ordered or non-ordered, input values.

It is realized that the graphical user interface comprising the text box 330 could also be provided by a software function which is accessed from a remote location by the device 300, such as via a HTML5 web page, as described above, which software function has access to individualized information regarding the hardware of the device 300 itself, such as its MAC address or serial number.

Figure 4:
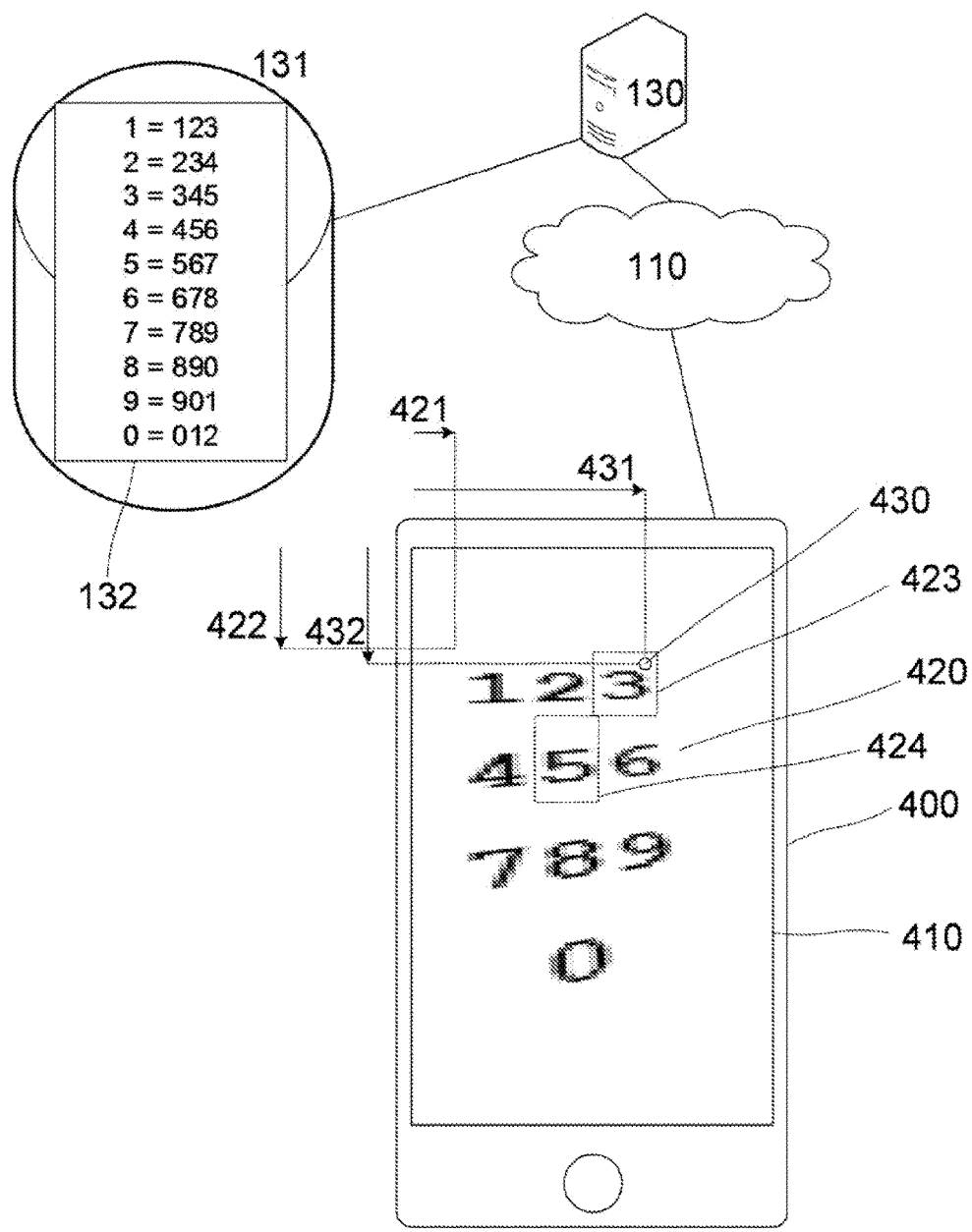

FIG. 4 illustrates a second exemplifying embodiment of the present invention, sharing reference numerals for like parts with FIG. 3, and the device 400 corresponds to devices 120, 122. The electronic mobile device 400 comprises a screen display 410, on which a software function is arranged to provide a graphical user interface comprising a user control. The user control in turn comprises several fields 423, 424 (only two indicated in FIG. 4, however it is realized that a corresponding field should be present for each one of the digits 0-9 shown) on the said screen display 410. Then, the user control can be activated in different ways by the user selecting different ones of said several fields 423, 424. Each field 423, 424 is associated with a respective code in the unique set of codes 132 for the electronic device 400 in question. As in FIG. 3, the information 132 is stored also in a way accessible to the software function, such as in the electronic device 400.

As is illustrated in FIG. 4, the screen display 410 is preferably a touchscreen, in other words a screen which provides interactivity to a user by sensing touches by the user on the screen display 410 itself. Alternatively, user selections on the screen display 410 can be made using a conventional computer mouse or the like.

According to a preferred embodiment, shown in FIG. 4, the software function is arranged to display digitally coded image material, on the screen display 410 in question, covering at least several of said fields 423, 424. In FIG. 4, the image material 420 is a raster image, such as a JPG or BMP image, graphically representing a respective piece of information (digits 0-9) in a respective field 423, 424 on the screen display 410. In particular, the image material 420 is a graphical illustration of a number grid, much like the one conventionally used on a smartphone for dialing a phone number. The fields 423, 424 themselves may be invisible graphically, merely defined by a respective set of connected pixels on the screen 410.

It is preferred that the image material 420 represents a number of different pieces of information, the respective location of which on the screen display 410 is occupied by the corresponding field 423, 424. However, the image material 420 could depict anything, as long as there is a consistent relationship between the dimensions of the displayed image material 420 and the extension on the screen of the above said fields 423, 424. For instance, a picture of a kitten can be used, whereby the user would be informed that the nose of the kitten represents "0", the left eye "1", and so forth.

According to a preferred embodiment, the software function is arranged to provide an interactive interface, preferably provided on the electronic device 400 but possibly via another device such as a web browser, via which the user is allowed to modify the contents of the image material 420. Examples comprise changing the image 420 to another image, or manipulating the image, such as rotating, stretching, mirroring, skewing, etc., the image 420. For instance, the screen coordinates 421, 422 at which the image 420 is displayed on the display screen 410 may be altered by the user so that the image 420 is translated across the screen 410. In the case of such image manipulations, it is preferred that the software function is also arranged to automatically impart the corresponding geometric manipulations, if any, of the fields 423, 424 on the display screen 410. In case of a translation by altering coordinates 421, 422, this would imply parallel translating all fields 423, 424 by the same (X, Y) magnitude as the image 420 itself.

In other embodiments, such manipulations may be automatically imparted, either by the software function, preferably in connection to the display of the image material 420 on the screen, or by the central server 130. For instance, one or several randomly selected image modifications may be made each time the user is to be authenticated, so that the displayed image will look different between two authentication events. In these cases, it is important that the fields 423, 424 are modified in the corresponding way.

Then, the software function is arranged to read a selected screen display coordinate 430, which is selected by the user for instance by touching it with the user's finger or stylus, and to translate the screen display coordinate 430 into a corresponding selected field 423 using a digitally stored mapping between screen coordinates 431, 432 and fields 423, 424 which mapping is only known to the software function. In other words, this mapping is not available to the operating system of the electronic device 400 in question, or to any piece of software which is not an integrated part of the software function. Preferably, the mapping is defined by the software function in connection to displaying the image 420.

As is clear from FIG. 4, the database 431 comprises the same dataset 132 as in the example illustrated in FIG. 3. This is because in the example illustrated in FIG. 4, the different fields 423, 424 correspond to different activation ways of the user control, whereby the selection of for instance field 423 is translated, by the software function and using the association in the software function between fields and pieces of information, into the specification the piece of information "3", having the associated code "345" in the software function. Hence, if the user in the image 420 selects, in order, "1", "4", "4", "2", the same concatenated code would be produced as described above in connection to FIG. 3, resulting in the same hash output value being sent to the central server 130.

It is preferred that no information regarding what image subpart 423, 424 corresponds to what particular field ("3", "5") is provided to any software code executing on the electronic device 400 apart from the software function described herein. Hence, in the device 400, no such other software has access to the association information using which the software function performs the translation from display screen 410 coordinate 431, 432 to particular piece of information.

Figure 5:
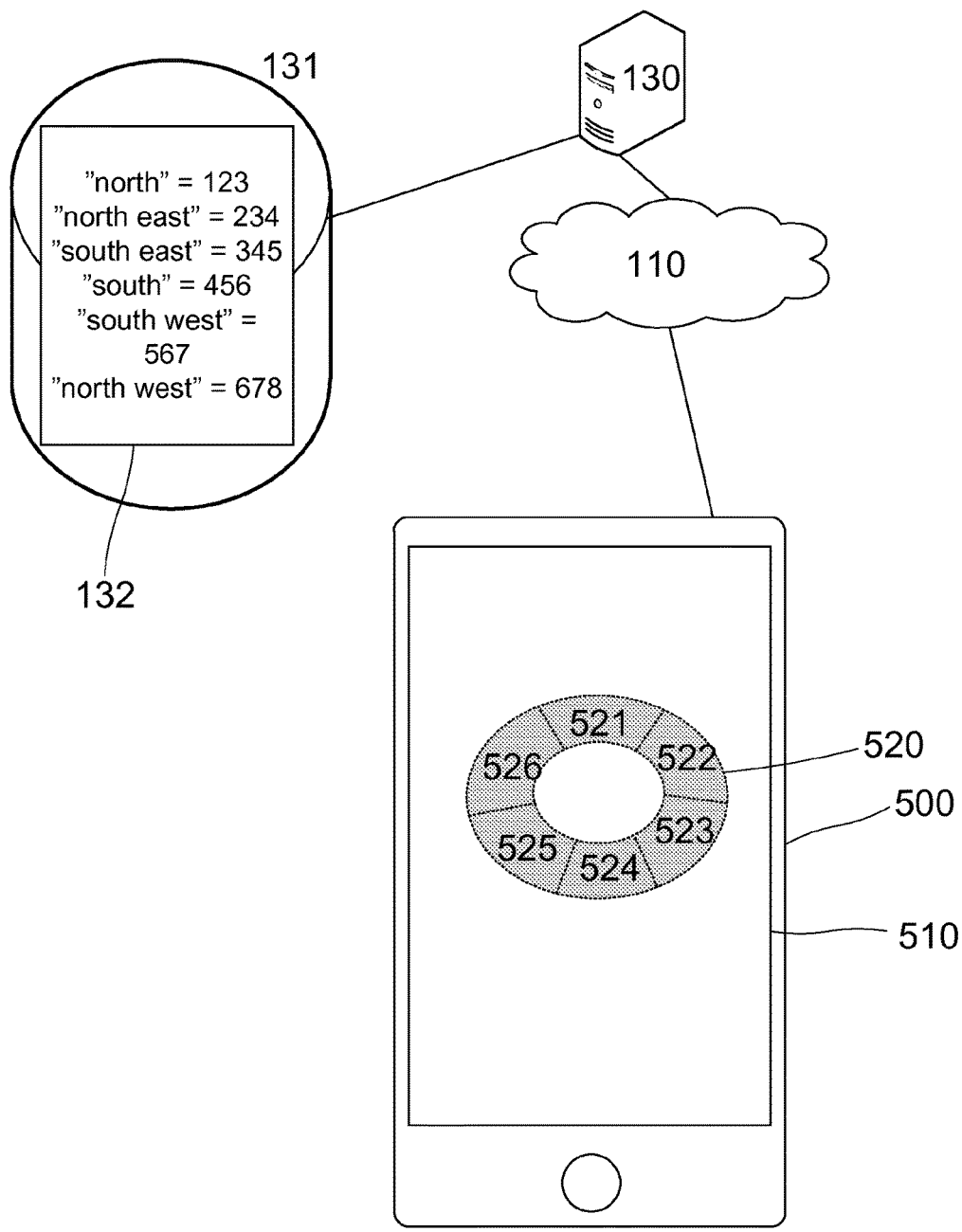

FIG. 5 illustrates a third preferred embodiment, in which an electronic device 500, corresponding to devices 120, 122, comprises a screen display 510 showing a user control comprising image data 520. FIG. 5 shares reference numerals with the other figures for like parts.

In this example, the graphical user interface provided by the software function is arranged to allow the user to swipe a finger across the screen display 510 in such a way so that several of the fields 521, 522, 523, 524, 525, 526 are touched in the process, and that the specified pieces of information correspond to the touched fields in question. Hence, the fields may be associated, in the software function, according to the following:

| Field | Piece of information | Code |
|---|---|---|
| 521 | "north part of circle" | 123 |
| 522 | "north east part of circle" | 234 |
| 523 | "south east part of circle" | 345 |
| 524 | "south part of circle" | 456 |
| 525 | "south west part of circle" | 567 |
| 526 | "north west part of circle" | 678 |

Hence, by the user swiping his or her finger from the top of the circle, clockwise, through fields 521, 522, 523, 524, 525 and finally ending on field 526, the corresponding codes 123, 234, 345, 456, 567 and 678 are specified, resulting in the concatenated code "123234345456567678", which is hashed in a looped fashion and is thereafter communicated to the central server 130, in a way which is similar to the above described. The shared secret in this case is hence comprised in the particular swipe pattern (the ellipse, clockwise), or alternatively the combination of information piece selection resulting in such swipe pattern, the latter in case the interpretation of each field ("north", "north east", etc.) is given a particular meaning to the user in the context of authentication.

According to a preferred embodiment, the image material 520 comprises image features corresponding to the swipe pattern to be used by the user. For instance, the image material comprises the gray ellipse shown in FIG. 5 (however possibly not the dotted lines, shown only for increased clarity in FIG. 5). In other examples, an image comprising elliptical features that cover the approximately same area as the gray ellipse, such as an image of a loaf of bread or anything else with roughly the same shape, can be used as image material 420. It is also realized that it is, of course, possible to use any open or closed shape, and not necessarily an elliptical one.

In one preferred embodiment, a user is allowed to select any image freely, and then to define a swipe pattern using that image. Then, the software function is arranged to track the swipe pattern specified by the user and to define a set of fields in relation to display screen 510 coordinates covering the swipe track path across the screen, to associate each one of these fields with a corresponding code, and then to share this information with the central server 130 over an encrypted communications channel. Then, when the user again swipes a finger across the display screen 510, the particular codes will be specified, in the correct order, and they are then expected for specification from the point of view of the central server 130, which in turn can authenticate the user. This provides a particularly simple way for the user to add additional security to the method, since the pieces of information will then not be visible as such on the screen 510 during use. Only the user will have knowledge about how to swipe across the particular image 520.

In FIGS. 4 and 5, the software function is arranged to display the image 420, 520 as a two-dimensional image on the two-dimensional screen display 410, 510.

Figure 6:
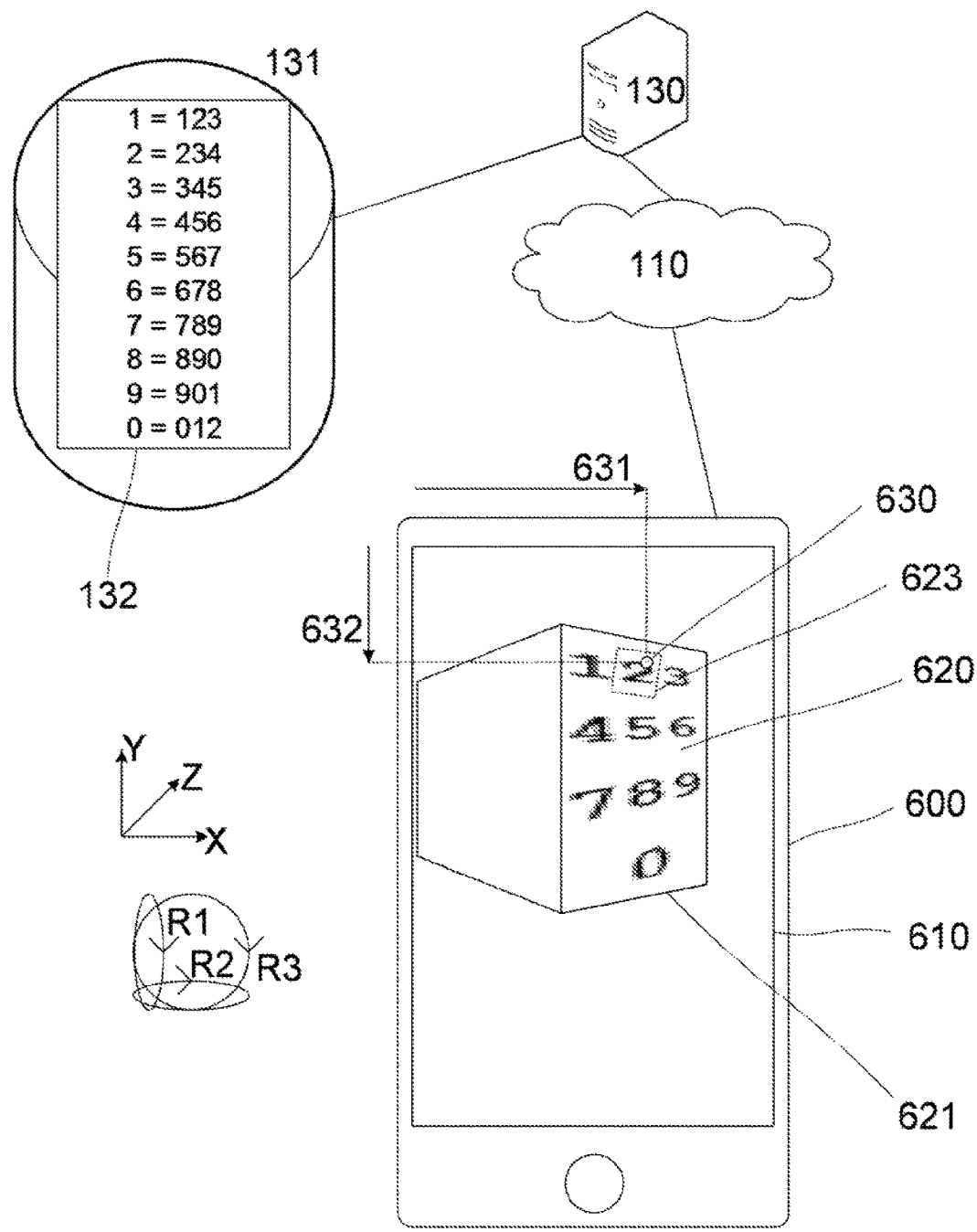

In contrast thereto, in FIG. 6, which illustrates another preferred embodiment of the present invention, which also shares reference numerals with FIG. 1 for like parts, and wherein the electronic device 600 corresponds to devices 120, 122, the image material 620 is displayed as a two-dimensional image surface in a three-dimensional structure 621, a projection of which three-dimensional structure 621 is shown on the screen display 610 of the electronic device 600. In the example shown in FIG. 6, the structure 621 is a cube which can be rotated along three axes of rotation R1, R2, R3, and translated along three linear directions X, Y, Z. The software function is, in this case, arranged to present an interactive graphical user interface allowing the user to preferably at least rotate the structure 621 in at least one rotational direction R1, R2, R3, preferably in all three rotational directions R1, R2, R3, and preferably also to translate the structure 621 along at least one direction X, Y, Z, preferably along all three directions X, Y, Z. Such rotation and translation may, for instance, take place by the user swiping a finger across the touchscreen 610 in suitable patterns. As the variables R1, R2, R3, X, Y, Z are altered, the projection of the cube 621 updates on the screen 610.

The image 620 is painted on one of the sides of the cube 621. Hence, the user can modify the location of the image 620 on the two-dimensional screen 610 by rotating and/or translating the three-dimensional structure 621. The 3D structure can be any suitable 3D structure, and one or several identical or different images 620 may be painted on surfaces of such 3D structure in any way. In FIG. 6, the selected point 630, with coordinates 631, 632 at the current rotation and translation of the structure 621, pertains to a field 623 associated with the piece of information being the number "2" and the code "234" (see reference numeral 132, pointing to a set of association information stored in the database 131 but also in the device 600).

Hence, the software function provides an interactive, graphical user interface on the screen display 610, allowing the user to manipulate the said three-dimensional structure 621, which constitutes the above described user control, so as to modify the position on the screen display 610 of the said image material 620 before selecting said at least one field 623 (only one shown in FIG. 6 for reasons of clarity), so that the positions of the fields 623 change as a result thereof. In other words, the software function is arranged to modify the geometric extension of the fields 623 so that they follow the corresponding geometric extensions of the parts of the image material representing particular pieces of information when the structure 621 is manipulated. Then, the user can specify a particular piece of information by activating the user control by selecting, on the screen display 610, one of the several fields 623.

This general principle, of using a user manipulable three-dimensional structure 621 with two-dimensional image material 620 painted on surfaces thereof, can be used in several ways. For instance, different character sets can be depicted on different surfaces of a suitable 3D structure; or the user can be encouraged to enter a PIN on the side of a cube which has certain one of several different available background colors. Then, image material painted on different sides of the three-dimensional structure 621 may correspond to different fields 623. In all such methods, it is preferred that the software function takes care of the graphical rendering of the structure 621 itself, in the sense that no other software, not being an integrated part of the software function, has access to the informational content of the structure 621. By such methods, the added security is achieved that an intercepting third party will also need knowledge about the nature and current state of the structure 621 in order to be able to intercept the user specifications. As described above, it is important that the two-dimensional geometric extensions of the fields 623 are updated in the same way as the image material 620 during user manipulations of the 3D structure 621.

According to another preferred embodiment, which may for instance be used with either the displaying approach illustrated in FIG. 4 or 5, or with the one illustrated in FIG. 6, the software function is arranged to provide a displayed image 420, 520, 620 which is variable, such as over time or in accordance with a progress parameter the value of which the user is allowed to influence using the said interactive graphical user interface software function.

In one example of this, the software function is arranged to automatically change the image 420, 520, 620 over time. For instance, the image 420 can be moved around the display 410 by continuously incrementing or modifying the coordinates 421, 422; the structure 621 can be continuously stretched, skewed or rotated in the R2 direction; or the image can be altered in any other way, preferably so that the location of at least one field 423, 521-526, 623 is also altered as a consequence. Fields and image are modified synchronously, as described above. Then, the user control can be activated in different ways by selecting a particular field at different current time or progress parameter values, for instance by different activation ways being identified both by selected field and selection time.

In a second example, the software function is arranged to allow the user to set the value of a progress parameter to a specific value before selecting the specific part of the image. The progress parameter can, for instance, be set by a slider control in the said interactive graphical user interface and can, for instance, control how long the image 420 or the structure 621 has travelled along a predetermined, possibly curvilinear path.

This will add an additional layer of security, since the user is allowed to control a parameter which is not readily available to software functions that are not integrated part of the software function described herein.

It is preferred that each code in said unique sets of codes comprises at least 128 bits of information.

As mentioned above, the invention relates to a method for authenticating a user to a central server 130, via an electronic device 120, 122, 300, 400, 500, 600. Furthermore, the invention relates to a system 100 and a software function, such as an installable, executable or accessible piece of computer software product, which system and software function are arranged to cooperate in the performance of a method according to the invention. As such, the system 100 in one aspect comprises the electronic devices 120, 122, 300, 400, 500, 600 themselves, and in another aspect, which is particularly useful when cooperating with a plurality of different electronic devices 120, 122, 300, 400, 500, 600, each running their own respective software product according to the invention, the system 100 does not comprise the electronic devices 120, 122, 300, 400, 500, 600 as such, but on the other hand the software function.

It is realized that all the aspects of the present invention described above are applicable, when possible, to said method, said system 100 and said computer software product, respectively.

In case the user forgets the shared secret (such as the PIN code to be entered in the example of FIG. 3), it is preferred that a message is sent over a separate communication channel, such as via an SMS message to the device 120, 122 in question, with the PIN code or a new PIN code. Since the device 120, 122 already has the associations between the pieces of information building up such a PIN code and the corresponding codes, the user can enter the new or same PIN code in the usual way (as described above), calculate the corresponding one-way function output value, and the server 130 can then, by performing the corresponding calculation, verify that the user entered the correct PIN code. Then, the user may be allowed to change the shared secret to something new.

In case the user has changed telephone numbers, such as after a SIM card replacement, the software function, which is already installed on the mobile device, can guarantee to the central server 130 that the user is still using the same mobile device by for instance reading a piece of hardware-specific information from the mobile device 120, 122, as described above, and communicating this to the central server 130.

It is preferred that the software function is arranged to allow the user to specify various parameters of the user control, either during initiation or afterwards. For instance, in case a N×M grid of fields is used in combination with an image, the user may change the values of N and M. Such specified or updated parameter data is shared between the device 120, 122 and the server 130 in a secure way, such as over a VPN tunnel set up using an authentication in turn based upon the user control as it way before an updated parameter value.

Above, a number of preferred embodiments have been described. However, it is apparent to the skilled person that many modifications can be made to the described embodiments without departing from the basic idea of the invention.

In general, the various embodiments described herein can be used in combination with one another when so is applicable.

Moreover, the present methods for authenticating a user via an electronic device can be used in many situations. For instance, such authentication can be used to set up a secure internet tunnel, such as a VPN (Virtual Private Network) tunnel for subsequent communication; to authenticate a money transfer; and for authenticating purchases and/or payments at physical points of sale. In particular, it is preferred that the one-way function output value as described above is used as a password used for setting up a SRP-TLS (Secure Remote Password—Transport Layer Security) tunnel between the sever 130 and the device 120, 122.

In particular, the various functionalities of the software function as described herein in relation to the different exemplifying embodiments can be applied across embodiments, whenever possible.

Hence, the present invention is not to be considered limited to the described embodiments, but is variable within the scope of the enclosed claims.

The invention claimed is:

1. A method for authenticating a user to a central server and using a selected one of several electronic devices, wherein the electronic devices each comprise a screen display and are arranged to communicate with the central server, the method comprising:
   a) associating, in the central server, each of the several electronic devices and/or each of a set of registered users, with a respective set of different digitally stored codes, wherein the digitally stored codes are known to both the electronic device in question and to the central server, and wherein each respective set of different digitally stored codes is unique for each electronic device and/or for each user of the set of users, and associating each code of each respective set of digitally stored codes with a piece of information in a predetermined set of information pieces;
   b) providing a software function, accessible from the selected electronic device, wherein the software function is provided access to unambiguous information regarding the identity of the selected electronic device in connection to the provided access;
   c) providing, by the software function, and on the screen display of the selected electronic device, a graphical user interface comprising a user control, wherein the user control is activatable in a plurality of ways, and wherein each of the plurality of ways is associated with a different respective code selected from the respective set of different digitally stored codes associated with the selected electronic device and/or the user;
   d) receiving, as a result of a particular activation of the user control in one of the plurality of ways, a certain piece of information in the predetermined set of information pieces, and determining a corresponding code, the corresponding code associated in step a) with the certain piece of information;
   e) calculating an output value of a predetermined one-way function, to which the determined corresponding code is used as an input value;
   f) communicating the calculated output value from the selected electronic device to the central server;
   g) calculating, by the central server, comparison output value of the one-way function, wherein, in calculating the comparison output value, the one-way function uses as an input value the corresponding code associated, in step a), with the certain piece of information received as a result of the activation of the user control in one of the plurality of ways of activation in step d); and
   h) authenticating the user if the calculated comparison output value equals the calculated output value, wherein the central server identifies each individual electronic device using a respective individualized local presence of the software function on the electronic device in question or using a hardware serial number of the electronic device.

2. The method according to claim 1, wherein the user control comprises several fields on the screen display of the selected electronic device, and wherein the user control can be activated in different ways by the user selecting different ones of said several fields.

3. The method according to claim 2, wherein the screen display is a touchscreen.

4. The method according to claim 2, wherein the software function is arranged to display image material, on the screen display, wherein the image material covers a plurality of the several fields, and wherein the image material represents the certain piece of information.

5. The method according to claim 3, wherein the graphical user interface is caused to allow the user to a swipe pattern of a finger across the screen display in such a way so that several of said fields are touched, and that the certain piece of information correspond to the touched fields.

6. The method according to claim 4, wherein the image material comprises image features corresponding to the swipe pattern of the finger.

7. The method according to claim 4, wherein the software function provides an interface via which the user can modify the contents of the image material.

8. The method according to claim 4, wherein the software function displays the image material as a two-dimensional image on the screen display.

9. The method according to claim 4, wherein the software function displays the image material as a two-dimensional surface in a three-dimensional structure, a projection of which is shown on the screen display.

10. The method according to claim 9, wherein the software function provides an interactive, graphical user interface on the screen display, allowing the user to manipulate the three-dimensional structure to modify the position on the screen display of the image material before selecting at least one field of the several fields, so that the positions of the fields change as a result of the manipulation.

11. The method according to claim 4, wherein the software function automatically changes the image material over time or provides an interactive graphical user interface on the screen display allowing the user to set the value of a progress parameter to a specific value before specifying at least one field of the several fields, and wherein the user control is activated in different ways of the plurality of ways by selecting a particular field for different current time or progress parameter values.

12. The method according to claim 1, wherein each code is a randomized alphanumerical sequence which is generated upon initiation of the software function on the electronic device in question and shared between the software function and the central server.

13. The method according to claim 1, wherein the software function reads a selected screen display coordinate and translates the screen display coordinate into a corresponding selected field using a digitally stored mapping between screen coordinates and fields that is only available to the software function.

14. The method according to claim 1, wherein the central server identifies each individual electronic device using a respective individualized local presence of the software function on the electronic device in question or using a hardware serial number of the electronic device.

15. The method according to claim 1, wherein, in step a), a respective one-way function is selected among a set of possible one-way functions and individually associated with each electronic device.

16. A system for authenticating a user, comprising:
   a central server;
   a selected one of several electronic devices, wherein each of the several electronic devices comprise a screen display and are arranged to communicate with the central server; and
   a software function, accessible from the selected electronic device;
   wherein the central server is configured to:
      associate each of the several electronic devices and/or each of a set of registered users, with a respective set of different digitally stored codes, wherein the digitally stored codes are known to both the electronic device in question and to the central server, and wherein each respective set of different digitally stored codes is unique for each electronic device and/or for each user of the set of users;

associate each code of each respective set of digitally stored codes with a piece of information in a predetermined set of information pieces;

wherein the software function is configured to:

provide, on the screen display of the selected electronic device, a graphical user interface comprising a user control, wherein the user control is activated in a plurality of ways, and wherein each of the plurality of ways of activation are associated with a different respective code selected from the respective set of different digitally stored codes associated with the selected electronic device and/or the user;

receive, as a result of activation of the user control in one of the plurality of ways of activation, a certain piece of information in the predetermined set of information pieces;

determine a corresponding code, the corresponding code associated by the server with the certain piece of information;

calculate an output value of a predetermined one-way function, to which the determined corresponding code is used as an input value; and communicate the calculated output value from the selected electronic device to the central server; and wherein the central server is further configured to:

calculate a comparison output value of the one-way function, wherein, in calculating the comparison output value, the one-way function uses as an input value the corresponding code associated by the server with the certain piece of information received as a result of the activation of the user control in one of the plurality of ways of activation;

authenticate the user if the calculated comparison output value equals the calculated output value, wherein the central server identifies each individual electronic device using a respective individualized local presence of the software function on the electronic device in question or using a hardware serial number of the electronic device.

17. A non-transitory computer-readable storage medium comprising instructions stored thereon, the instructions, when executed by an authentication system comprising a central server and a selected one of several electronic devices, arranged to communicate with the central server, cause the authentication system to perform the steps comprising:

a) associating, in the central server, each of the several electronic devices and/or each of a set of registered users, with a respective set of different digitally stored codes, wherein the digitally stored codes are known to both the electronic device in question and to the central server, and wherein each respective set of different digitally stored codes is unique for each electronic device and/or for each user of the set of users, and associating each code of each respective set of digitally stored codes with a piece of information in a predetermined set of information pieces;

b) providing a software function, accessible from the selected electronic device, wherein the software function is provided access to unambiguous information regarding the identity of the selected electronic device in connection to the provided access;

c) providing, by the software function, and on a screen display of the selected electronic device, a graphical user interface comprising a user control, wherein the user control is activated in a plurality of ways, and wherein each of the plurality of ways of activation are associated with a different respective code selected from the respective set of different digitally stored codes associated with the selected electronic device and/or the user;

d) receiving, as a result of activation of the user control in one of the plurality of ways of activation, a certain piece of information in the predetermined set of information pieces, and determining a corresponding code, the corresponding code associated in step a) with the certain piece of information;

e) calculating an output value of a predetermined one-way function, to which the determined corresponding code is used as an input value;

f) communicating the calculated output value from the selected electronic device to the central server;

g) calculating, by the central server, a comparison output value of the one-way function, wherein, in calculating the comparison output value, the one-way function uses as an input value the corresponding code associated, in step a), with the certain piece of information received as a result of the activation of the user control in one of the plurality of ways of activation in step d); and h) authenticating the user if the calculated comparison output value equals the calculated output value, wherein the central server identifies each individual electronic device using a respective individualized local presence of the software function on the electronic device in question or using a hardware serial number of the electronic device.

* * * * *